J. RICE.
GIN SAW SHARPENER.
APPLICATION FILED APR. 2, 1913.
1,076,996.
Patented Oct. 28, 1913.
2 SHEETS—SHEET 1.
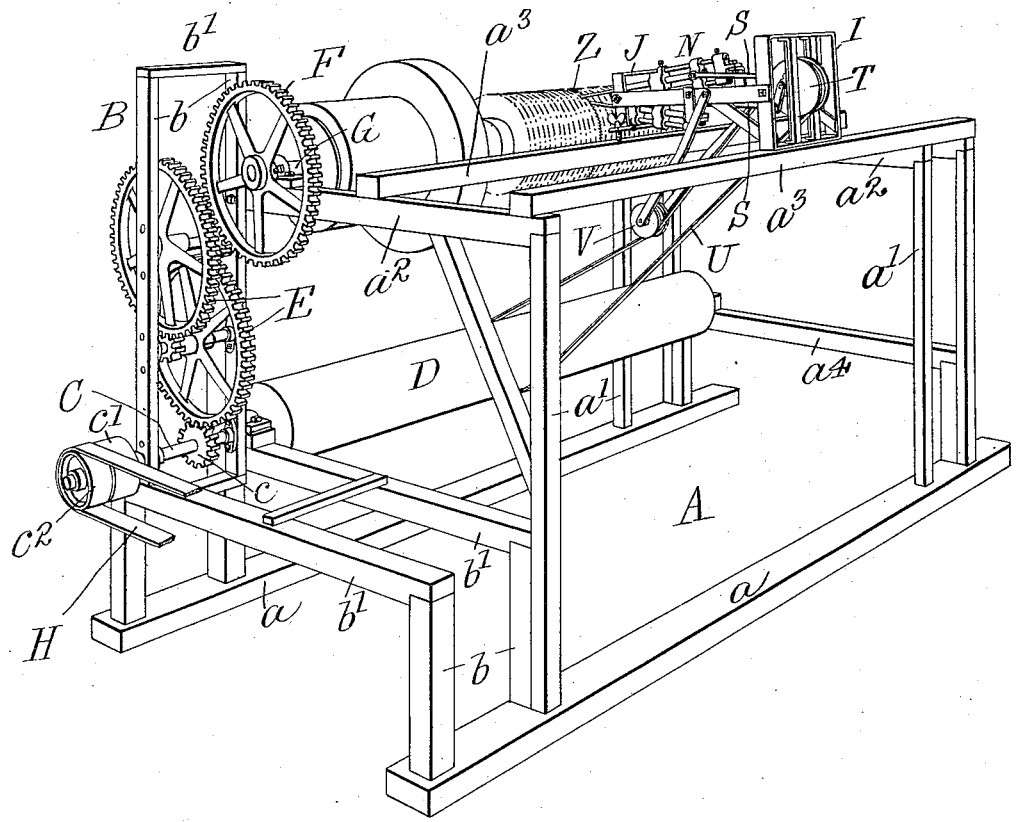
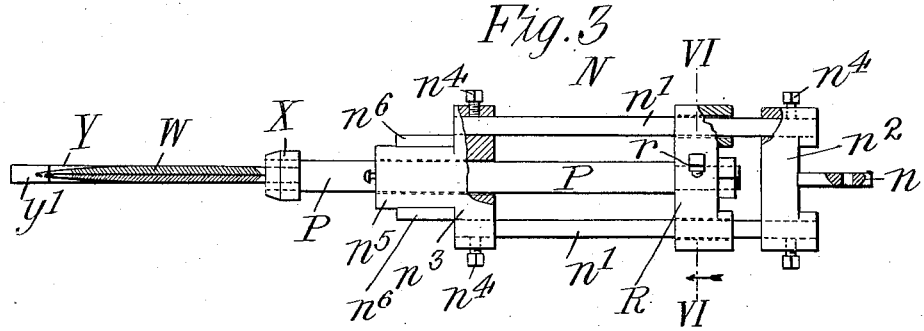

J. RICE.
GIN SAW SHARPENER.
APPLICATION FILED APR. 2, 1913.
1,076,996.
Patented Oct. 28, 1913.
2 SHEETS—SHEET 2.
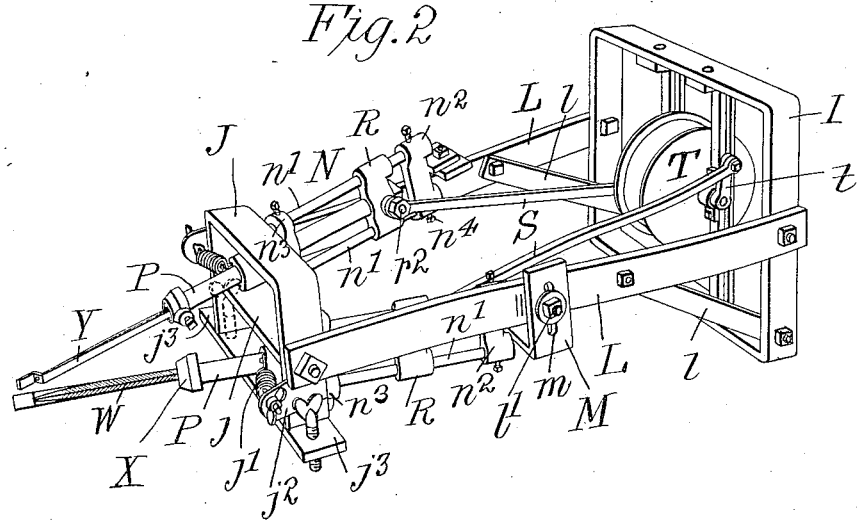
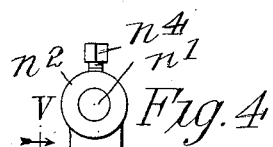
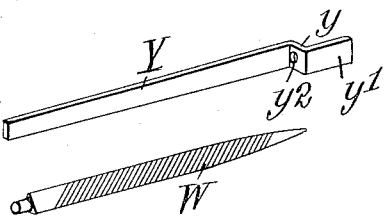
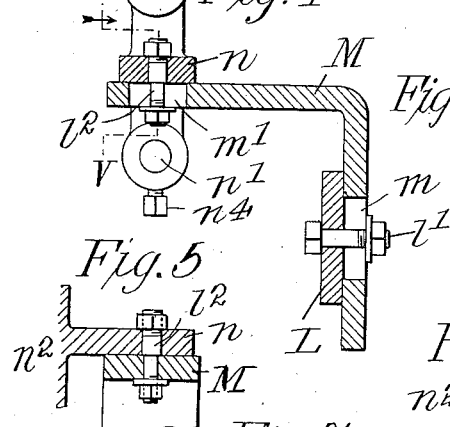
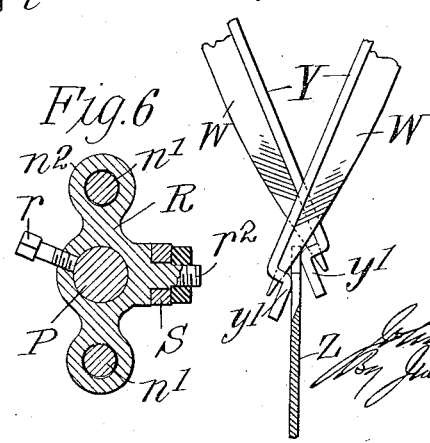
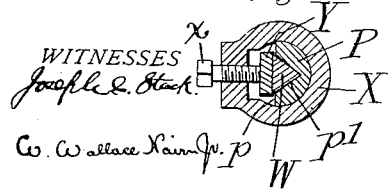

UNITED STATES PATENT OFFICE.

JOHN RICE, OF FORT PAYNE, ALABAMA.

GIN-SAW SHARPENER.

1,076,996. Specification of Letters Patent. Patented Oct. 28, 1913.

Application filed April 2, 1913. Serial No. 758,462.

*To all whom it may concern:*

Be it known that I, JOHN RICE, a citizen of the United States, residing at Fort Payne, in the county of Dekalb and State of Alabama, have invented certain new and useful Improvements in Gin-Saw Sharpeners; and I do hereby declare the following to be a full, clear, and exact description of the invention, such as will enable others skilled in the art to which it appertains to make and use the same.

This invention relates to mechanism for sharpening the saws of cotton gins, and has for its object to provide a simplified and improved machine for this purpose which can be readily transported from place to place by an itinerant gin repairer and which is adapted to automatically sharpen all the teeth of a saw without adjustment or interruption.

Another object is to adapt the sharpener for use on saws of various types, having teeth of different size and pitch.

Still another object is to provide for automatically withdrawing the file from the throats of the teeth being sharpened, in order to permit the feeding or turning of the saw for bringing the throats of the next teeth into position to be entered by said file, whereby the successive sharpening of all the teeth of the saw may be effected continuously.

Further objects and advantages of this invention will appear from the following description.

The invention will first be hereinafter described, with reference to the accompanying drawings, which constitute a part of this specification, and then more particularly pointed out in the claims at the end of the description.

In the accompanying drawings, in which the same parts are indicated by similar reference characters throughout: Figure 1 is a perspective view of one embodiment of this invention; Fig. 2 is an enlarged detailed perspective view of the file supporting and actuating mechanism; Fig. 3 is a detailed side elevation of one of the reciprocating file-carrying rods and its guide, parts being broken away for clearness; Fig. 4 is a cross-section, on an enlarged scale, of one of the brackets for supporting the rear end of said guide; Fig. 5 is a sectional view taken on the line V—V of Fig. 4, to more clearly illustrate the slot in the horizontal portion of the bracket, and the means for connecting the file-rod guide thereto, whereby the rear end of the latter may be adjusted laterally for regulating the length of the gin saw teeth; Fig. 6 is an enlarged cross-section through the cross head and guide of the file-carrying rod, taken on the line VI—VI of Fig. 3, looking in the direction of the arrow; Fig. 7 is an enlarged cross-section of the collar or cuff on the outer end of the file-carrying rod, showing the file and fender secured thereto; Fig. 8 is a detailed perspective view of one of the files and its fender, and Fig. 9 is an enlarged plan view of the front ends of the files and their fenders, showing their positions with respect to the saw when the latter is being turned to bring the throats of the next teeth in succession opposite the files.

In Fig. 1, A designates the framework of the machine which may consist of bed timbers $a$, uprights $a^1$, upper cross-pieces $a^2$, and a pair of longitudinal upper strips $a^3$ intended for supporting the file-actuating mechanism as will be hereinafter explained. An auxiliary frame B, at one end of the main framework A, comprises uprights $b$, resting upon the bed timbers $a$, and horizontal pieces $b^1$. Two of said uprights $b$ extend upward above the others and preferably above the top of the main framework A, and through said higher uprights may be passed a shaft C carrying a gear $c$ and a pair of pulleys, one $c^1$ being fast thereon, and the other $c^2$ being loose. The gear $c$ is preferably arranged between the uprights and the pulleys beyond the outer one. The shaft C also extends longitudinally either part way or entirely through the main framework, being journaled at its extremity upon a cross-piece $a^4$ at the opposite end of said framework from that at which the auxiliary frame B is arranged. This inner extension of the shaft C carries a long roll or pulley D. A train of gears E is journaled between the uprights $b$, the gear at one end of the train meshing with the gear $c$ on the shaft C, and the other end gear of the train meshing with a gear F on a longtiudinal shaft G supported upon the cross-pieces $a^2$ of the main framework. This shaft G is designed for carrying the gin saws, as illustrated in Fig. 1, said saws being driven at a slow speed through said train of gears when a driving belt H, from any suitable source of power, is shifted from the loose pulley $c^2$ to the fast pulley $c^1$.

The grinding or sharpening mechanism proper, which is illustrated as a whole in Fig. 2, and in detail in Figs. 3 to 9 inclusive, consists generally of a pair of reciprocating file-carrying rods, guides therefor, and means for actuating said rods. These parts are carried or supported by a pair of yokes I and J spaced apart substantially the same distance as the longitudinal strips $a^3$ of the framework A, and rigidly connected together by side bars L and braces $l$. To the bars L, intermediate of the yokes, there are attached angular brackets M, one of which extends upwardly and the other downwardly. The connection of each of said brackets to its bar L is preferably made by a bolt $l^1$ passed through a vertical slot $m$ in the vertical portion of the bracket. The horizontal portion of each bracket is also provided with a slot $m^1$ through which a bolt $l^2$ is passed from a lug $n$ on the rear end of the guide N for the file-carrying rod P. Each guide N comprises two parallel rods $n^1$, and inner and outer cross-pieces or connectors $n^2$ and $n^3$ respectively. The connector $n^2$ carries the lug $n$ already described as attached to the bracket M. The other connector $n^3$ is bored to receive the file-carrying rod P which is adapted to reciprocate in said bore. One end of said rod P is detachably secured in any suitable manner to a cross-head R mounted to slide on the rods $n^1$ of the guide N, as clearly illustrated in Figs. 3 and 6. Said rods $n^1$ may be detachably fastened to the connectors $n^2$ and $n^3$ by set screws $n^4$ to provide for assembling and adjusting the parts.

The file-carrying rod P is adapted to turn in the cross-head R but is normally retained fast therein at the proper adjustment by a set screw $r$ best shown in Figs. 3 and 6. Said cross-head also has a wrist pin $r^2$ to which a pitman S is attached. Said pitman is also attached to a crank $t$ on the shaft of a pulley T suitably journaled in the yoke I and driven by a belt U from the long pulley or roll D, see Fig. 1. An idle pulley V may be used to tension this belt U. The yoke J may be divided horizontally by a partition $j$, Fig. 1. The connectors $n^3$ of the guides N are provided with extended sleeves $n^5$ on which are mounted roller bearings $n^6$. The sleeve $n^5$ of one of the guides extends into the upper part of the yoke J, and the roller bearing on said sleeve rests on the partition $j$. The sleeve of the other guide extends into the lower part of said yoke J and the roller bearing $n^6$ on that sleeve rests upon the base of the yoke. The guide which projects into the upper part of the yoke J is the one that is attached at its rear end to the upwardly extending bracket M, while the downwardly extending bracket is connected to the guide which projects into the lower part of said yoke. The end portion of each of the sleeves $n^5$ is connected by a coiled spring $j^1$ to an ear $j^2$ on the adjacent side of the yoke J, whereby the front end of each guide is yieldingly held at the same side of said yoke as its rear end.

The front end of each of the file-carrying rods P is flattened on one side, as at $p$, Fig. 7, and in said flattened side there is formed a V-shaped groove $p^1$ to fit the end of a file W. Around said flattened and grooved end portion of the rod P, there is fitted a collar or cuff X having a set-screw $x$ for clamping the file to the rod. One end of a fender Y is also clamped in said collar by the set-screw, as clearly shown in Figs. 2 and 7. The other end of said fender is crooked or offset to form a transverse portion $y$ and a longitudinally extending portion $y^1$, the latter arranged parallel to but out of the plane of the main part of the fender, see Fig. 8. The transverse portion $y$ is provided with an aperture $y^2$ into which the tapered end of the file fits when the other end of the same is clamped with the fender in the collar X. It will be noted that one flat face of the file is engaged by the fender, leaving the other two faces thereof exposed and in proper position to engage the throat of each successive tooth of the gin saw for sharpening the same.

In the operation of the sharpener the offset portions $y^1$ of the fenders strike the side faces of the saw when the files are withdrawn, thereby throwing said files out of the throats of the teeth just sharpened and permitting the saw to turn without obstruction to bring the throats of the next teeth into position to be whetted by said files. It will be understood that the driving of the shaft C by the shifting of the belt H from the loose pulley $c^2$ to the fast pulley $c^1$ in any suitable manner, will rotate the pulley T on the grinding mechanism at a much higher speed through the direct belt connection with the long pulley or roll D than the gin saws Z, Fig. 1, are turned by the train of gears E from the same shaft C. As illustrated, the machine is adapted to give about 480 revolutions to the pulley T to each revolution of the shaft G carrying the gin saws. The rotation of said pulley T turns the cranks $t$ and they in turn reciprocate the file-carrying rods through the medium of the pitmen S, said rods being guided in their movements by the passages in the front connectors $n^3$ and the cross-heads R sliding on the rods $n^1$ of the guides N. The sharpening mechanism is supported in operative position by the yokes I and J resting upon the longitudinal strips $a^3$ of the framework A. At least the yoke I rests directly on one of said strips, while the yoke J is preferably supported above the other strip by a pair of thumb-screws threaded in lateral extensions $j^3$ from the base of the said latter yoke. By means of these thumb-screws, the end of said sharpening mechanism adjacent the gin saws may be raised or lowered, thus altering the incline of the file-carrying rods and giving the files the proper pitch with respect to the teeth of the gin saw. If desired, a plurality of sharpening devices may be used at the same time, there being plenty of room for several of them side by side on the strips $a^3$, and for the belts U for driving said sharpening devices on the long pulley or roll D. It will be understood, of course, that the use of several sharpening devices simultaneously will greatly expedite the sharpening of a full set of gin saws, the several devices being all moved laterally from time to time, as the sharpening of the saws operated upon is completed, in order to bring said devices into position to act upon the next saws until all of the saws in the respective groups between adjacent sharpening devices have been whetted. In addition to the vertical adjustment of the yoke J, in order to vary the inclination of the sharpening device as a whole, the files may be independently adjusted laterally and vertically at their outer ends by means of the slots $m$ and $m^1$ in the brackets M, and said files may also be rotated when the set-screws $r$ which clamp the file-carrying rods P to the cross-heads R are loosened. This rotary adjustment of the files allows them to be turned to engage any part of the saw teeth which needs sharpening. The lateral adjustment of the rear ends of the file-carrying rods in the slots $m^1$ of the brackets M controls the length of the teeth of the saws, while the vertical adjustment of said rear ends of said rods by reason of the slots $m$ in the brackets also provide for adjusting the files to correspond to the pitch of the saw teeth. Thus it will be seen that the sharpening device may be readily and quickly adjusted to meet all requirements in actual use. Moreover, the machine as a whole, is of such a nature that it can be easily carried around by traveling gin repairers. The drive of the file-carrying rods being from the rear, and the springs $j^1$ being adapted to yieldingly hold the front end portions of said rod with the files in contact with the saws, said files are in a sense self-adjusting to the saw teeth during the sharpening operations, and the splitting of said teeth is therefore prevented.

Having thus described my invention, what I claim as new and desire to secure by Letters Patent of the United States is:

1. In a sharpener for gin saws, the combination with a frame, of two yokes connected rigidly together by side bars, angular brackets secured to said side bars, one of said brackets extending upwardly and the other downwardly therefrom, a pair of guides attached respectively to said brackets and extending through one of the yokes, means for yieldingly holding said guides at opposite sides of said yoke, and file carriers mounted to reciprocate in said guides.

2. In a sharpener for gin saws, the combination with a frame, of a yoke mounted thereon, a guide also mounted on the frame and having a sleeve at one end projecting into the yoke, a roller bearing on said sleeve and in contact with the yoke, means for yieldingly holding said sleeve to one side of the yoke, and a file carrier mounted to reciprocate in said guide.

3. In a sharpener for gin saws, the combination with a guide consisting of parallel rods and connectors at their ends, of a cross-head slidably mounted on said rods, a file carrier secured to said cross-head and slidably mounted in the front connector, and means to reciprocate said carrier.

4. In a sharpener for gin saws, the combination with a guide, of a file carrier mounted to be reciprocated thereon, a fender detachably secured to said carrier and having an apertured crook at its outer end terminating in an offset portion, a file having one end fitted into said apertured crook and the other end secured to said carrier, the outer offset portion of said crook being adapted to throw the file out of the throat of one tooth of a saw to permit said saw at the end of the inward stroke of the carrier to be turned so as to present another tooth to said file.

5. In a sharpener for gin saws, the combination with a guide consisting of parallel rods, of a cross-head slidably mounted on said rods, and a file-carrier attached to said cross-head and adapted to be rotatably adjusted with respect thereto for the purpose specified.

In testimony whereof I affix my signature in the presence of two witnesses.

JOHN RICE.

Witnesses:
 JAS. A. CROLEY,
 P. C. HALE.

---

Copies of this patent may be obtained for five cents each, by addressing the "Commissioner of Patents, Washington, D. C."